US006250475B1

(12) United States Patent
Kwasniewicz et al.

(10) Patent No.: US 6,250,475 B1

(45) Date of Patent: Jun. 26, 2001

(54) PERMANENT MAGNET SEPARATOR HAVING MOVEABLE STRIPPER PLATE

(75) Inventors: Ron W. Kwasniewicz, Walled Lake; Dennis Trestain, Mason, both of MI (US)

(73) Assignee: Magnetic Products, Inc., Highland, MI (US)

( * ) Notice: Subject to any disclaimer, the term of this patent is extended or adjusted under 35 U.S.C. 154(b) by 0 days.

(21) Appl. No.: 09/303,269

(22) Filed: Apr. 30, 1999

Related U.S. Application Data

(60) Provisional application No. 60/083,760, filed on May 1, 1998.

(51) Int. Cl.[7] .............................. B03C 1/00; B01D 35/06

(52) U.S. Cl. .................. 209/229; 209/223.1; 209/223.2; 210/222

(58) Field of Search ............................ 210/222; 209/215, 209/223.1, 223.2, 229, 231

(56) References Cited

U.S. PATENT DOCUMENTS

| | | | | |
|---|---|---|---|---|
| 3,712,472 | * | 1/1973 | Elliott | 210/222 |
| 4,394,264 | * | 7/1983 | Schimion et al. | 210/222 |
| 4,457,838 | * | 7/1984 | Carr | 209/223.2 |
| 4,867,869 | * | 9/1989 | Barrett | 209/223.2 |
| 5,043,063 | * | 8/1991 | Latimer | 210/222 |
| 5,066,390 | * | 11/1991 | Rhodes et al. | 209/217 |
| 5,188,239 | * | 2/1993 | Stowe | 209/223.1 |
| 5,190,159 | * | 3/1993 | Barker | 209/223.2 |
| 5,982,261 | * | 11/1999 | Stowe | 335/306 |
| 6,077,333 | * | 6/2000 | Wolfs | 96/1 |
| 6,099,739 | * | 8/2000 | Kobayashi | 210/695 |

* cited by examiner

*Primary Examiner*—Donald P. Walsh
*Assistant Examiner*—Daniel K Schlak

(74) *Attorney, Agent, or Firm*—Bliss McGlynn, P.C.

(57) ABSTRACT

A magnetic separator includes a housing defining a product flow path through which material may pass. The separator also includes a drawer and a plurality of non-magnetic tubes operatively connected to the drawer and within which are supported a corresponding plurality of magnets. The drawer is movable between a first position wherein the plurality of magnets are positioned within the product flow path and a second position wherein the plurality of magnets are withdrawn from the flow path. A stripper plate is disposed between the housing and the drawer. The stripper plate has a plurality of apertures corresponding to and in close conforming contact with the plurality of non-magnetic tubes and through which the plurality of tubes pass as the drawer is moved between its first and second positions. The stripper plate is movable from a first position adjacent to the housing when the drawer is in its first position and the magnets are disposed within the product flow path to a second position spaced a predetermined distance from the housing as the drawer is moved to its second position and the plurality of tubes are withdrawn from the product flow path. The plurality of apertures on the stripper plate serve to strip material which has been attracted to the plurality of magnets and disposed on the tubes. The magnetic separator further includes an actuator including a movable rack which is operatively coupled to the drawer and a sprocket gear. The sprocket gear is rotatably driven to provide rectilinear movement of the rack such that the drawer may be selectively moved between its first and second positions. Furthermore, the magnetic separator includes a stripper plate actuator which assists in moving the stripper plate from its first position adjacent to the housing to its second position spaced from the housing. Finally, the magnetic separator also includes a latch mechanism which acts to automatically bias the stripper plate toward the housing into its first position such that the stripper plate is in sealing engagement with the housing when the drawer is moved to its first position and the magnets are positioned within the product flow path.

19 Claims, 6 Drawing Sheets

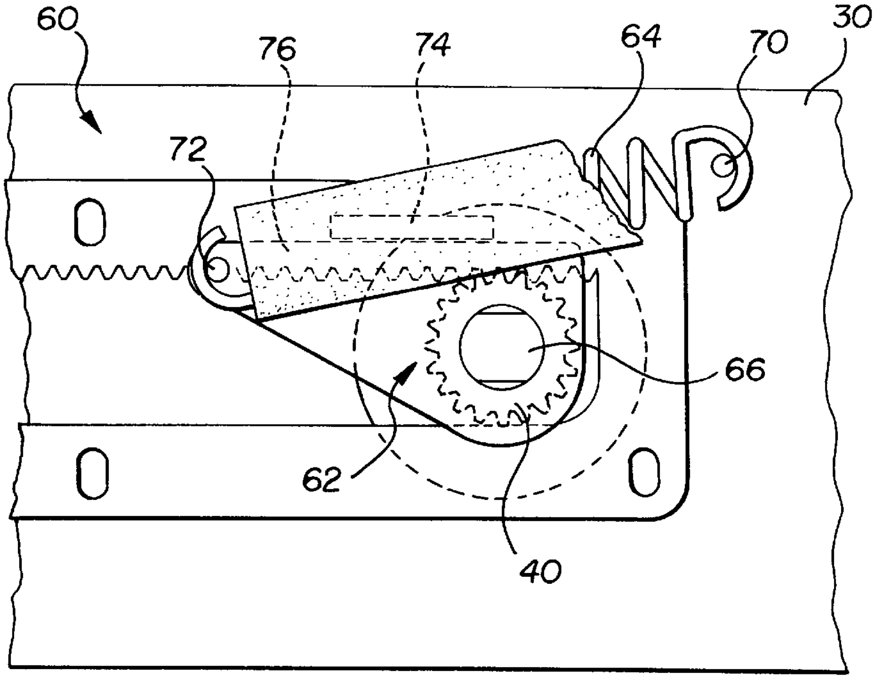
FIG-7
FIG-8
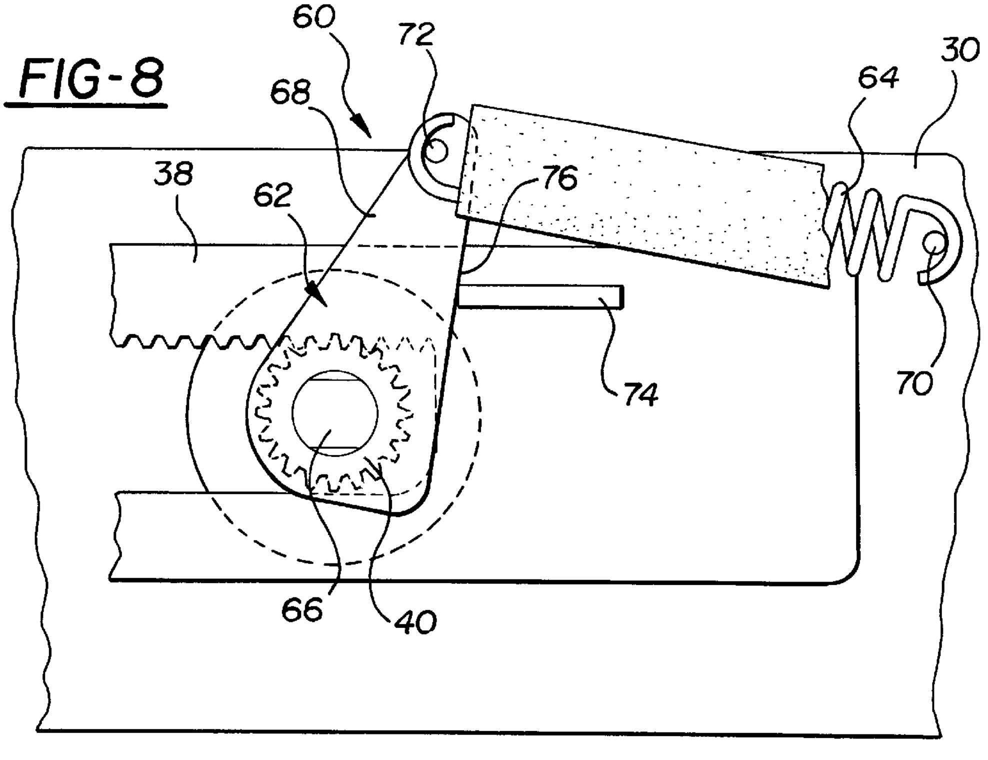

PERMANENT MAGNET SEPARATOR HAVING MOVEABLE STRIPPER PLATE

This application claims the benefit of U.S. Provisional Application No. 60/083,760, filed May 1, 1998.

BACKGROUND OF THE INVENTION

1. Field of the Invention

The present invention relates to permanent magnet separators employed for removing ferrous materials from a product stream. More specifically, the present invention is directed toward permanent magnet separators having improved actuating features for cleaning the magnets.

2. Description of the Related Art

Permanent magnet separators are employed in many food processing operations and are even mandatorily required in some. They are also used in the manufacture of pharmaceuticals, in the chemical industry where process lines are alternatingly used for two or more incompatible products and wherever the highest degree of product purity is required. These devices often include a housing defining a hopper through which a number of non-magnetic tubes are mounted transverse to the product flow through the hopper. A plurality of magnets are located within the non-magnetic tubes. As the product flows past the tubes, ferrous particles are collected on the outer diameters thereof.

At various times during the product processing operations, the ferrous materials that collect on the tubes must be removed. To this end, the tubes are removed from the product flow area to a position typically outside the housing. A fixed plate or other wiper mechanism is disposed about the outer diameter of each tube to scrape the ferrous materials off the tube as it is withdrawn. The ferrous materials fall by gravity outside of the product flow area and onto the floor or into a collection receptacle. The tubes, and therefore the magnets housed therein, are then returned to their operative position transverse to the product flow within the hopper.

In the past, it has been known to actuate the tubes between their position transverse to the product flow within the hopper to the position outside of the hopper during the tube cleaning operation. This actuation was typically accomplished either manually or using pneumatic piston cylinder arrangements. Typically, a handle on the framework supporting the magnet was used by the operator to manually displace the magnet out of the hopper. On the other hand, the piston cylinder arrangements are operative to periodically reciprocate the tube assembly between their product flow and tube cleaning dispositions. The permanent magnet separators may be made “self-cleaning” by initiating movement of the tubes via the piston cylinder arrangement using controls.

Self-cleaning permanent magnet separators enjoy the advantage that they eliminate the need to shut down product lines to remove, clean and reinstall magnetic elements. Thus, self-cleaning permanent magnets make the cleaning of the tubes easier and more frequent cleaning prevents excessive iron contamination buildup on the magnets and assures maximum separating efficiency.

Despite these advantages, problems remain in the related art. For example, it is not uncommon for the pneumatic piston/cylinder arrangement to be subject to air of poor quality or low pressure. In these cases, it was not uncommon for the separator unit to fail or to not operate as designed with respect to cycle time or stroke distance of the magnet actuator. Additionally, where the climate is severe such as found outdoors or in northern regions, it was possible for the actuator unit to freeze. Further, where the permanent magnet separators are employed to filter very fine mesh products, the actuator unit can jam or not completely open or close from time to time and thus require more maintenance in the form of disassembly and cleaning. Recent analysis has also determined that the use of pneumatic piston/cylinder arrangements for magnet actuators add an unacceptable level of cost to the units. Furthermore, in larger applications, some permanent magnet separators become difficult, and sometimes impossible, to operate due to the force required to strip the magnets clean and the weight of the tubes as they are suspended during the cleaning operations.

Thus, there remains a need in the art for a permanent magnet separator which can quickly, efficiently and reliably clean the tubes in a cost-effective manner and which can be actuated either manually or automatically.

SUMMARY OF THE INVENTION AND ADVANTAGES

The present invention overcomes the disadvantages in the related art in a magnetic separator including a housing which defines a product flow path through which material may pass. The separator also includes a drawer and a plurality of non-magnetic tubes operatively connected to the drawer and within which are supported a corresponding plurality of magnets. The drawer is movable between a first position wherein the plurality of magnets are positioned within the product flow path and a second position wherein the plurality of magnets are withdrawn from the flow path. Furthermore, the magnetic separator includes an actuator including a movable rack which is operatively coupled to the drawer and a sprocket gear. The sprocket gear is rotatably driven to provide rectilinear movement to the rack such that the drawer may be selectively moved between its first and second positions. The actuator of the present invention has distinct advantages over the related art. More specifically, the rack and sprocket arrangement employed by the actuator is much more cost-effective than the pneumatic cylinders employed in the related art and result in an improved reliability of operation regardless of the application and/or environment. The rack and sprocket arrangement also reduces the force required to withdraw the tubes from the product flow path and helps to eliminate jamming caused by misaligned tubes. Furthermore, permanent magnet separator units employing the actuator of the present invention may be quickly and easily upgraded from a manually powered unit to a self-clean or motor-driven model at minimum cost.

The magnetic separator of the present invention also includes a stripper plate disposed between the housing and the drawer. The stripper plate includes a plurality of apertures corresponding to and in close conforming contact with the plurality of non-magnetic tubes and through which the plurality of tubes pass as the drawer is moved between its first and second positions. The stripper plate is movable from a first position adjacent the housing when the drawer is in its first position and the plurality of magnets are disposed in the product flow path to a second position spaced a predetermined distance from the housing as the drawer is moved to its second position and the plurality of tubes are withdrawn from the product flow path. The plurality of apertures serve to strip material which has been attracted to the plurality of magnets and is disposed on the tubes. In addition, the magnet separator includes a stripper plate actuator which assists in moving the stripper plate from its first position adjacent to the housing to its second housing spaced from the housing. The stripper plate actuator of the present invention thereby facilitates and improved operation of the permanent magnet separator resulting in better cleaning of the tubes and reduced wear of the stripper plate.

In addition, the magnet separator of the present invention also includes a latch mechanism which acts to automatically bias the stripper plate toward the housing into its first position such that the stripper plate is in sealing engagement with the housing when the drawer is moved to its first position and the magnets are positioned within the product flow path. Thus, the latch mechanism of the present invention also facilitates an improved operation of the permanent magnet separator resulting in tight, sealing engagement between the stripper plate and the housing.

BRIEF DESCRIPTION OF THE DRAWINGS

Other advantages of the invention will be readily appreciated as the same becomes better understood by reference to the following detailed description when considered in connection with the accompanying drawings, wherein:

FIG. 7 is a partial side view illustrating the door seal latch mechanism when the stripper plate is in its closed position; and FIG. 8 is a partial side view illustrating the door seal latch mechanism when the stripper plate is in its open position.

DETAILED DESCRIPTION OF THE PREFERRED EMBODIMENT(S)

Figure 1:
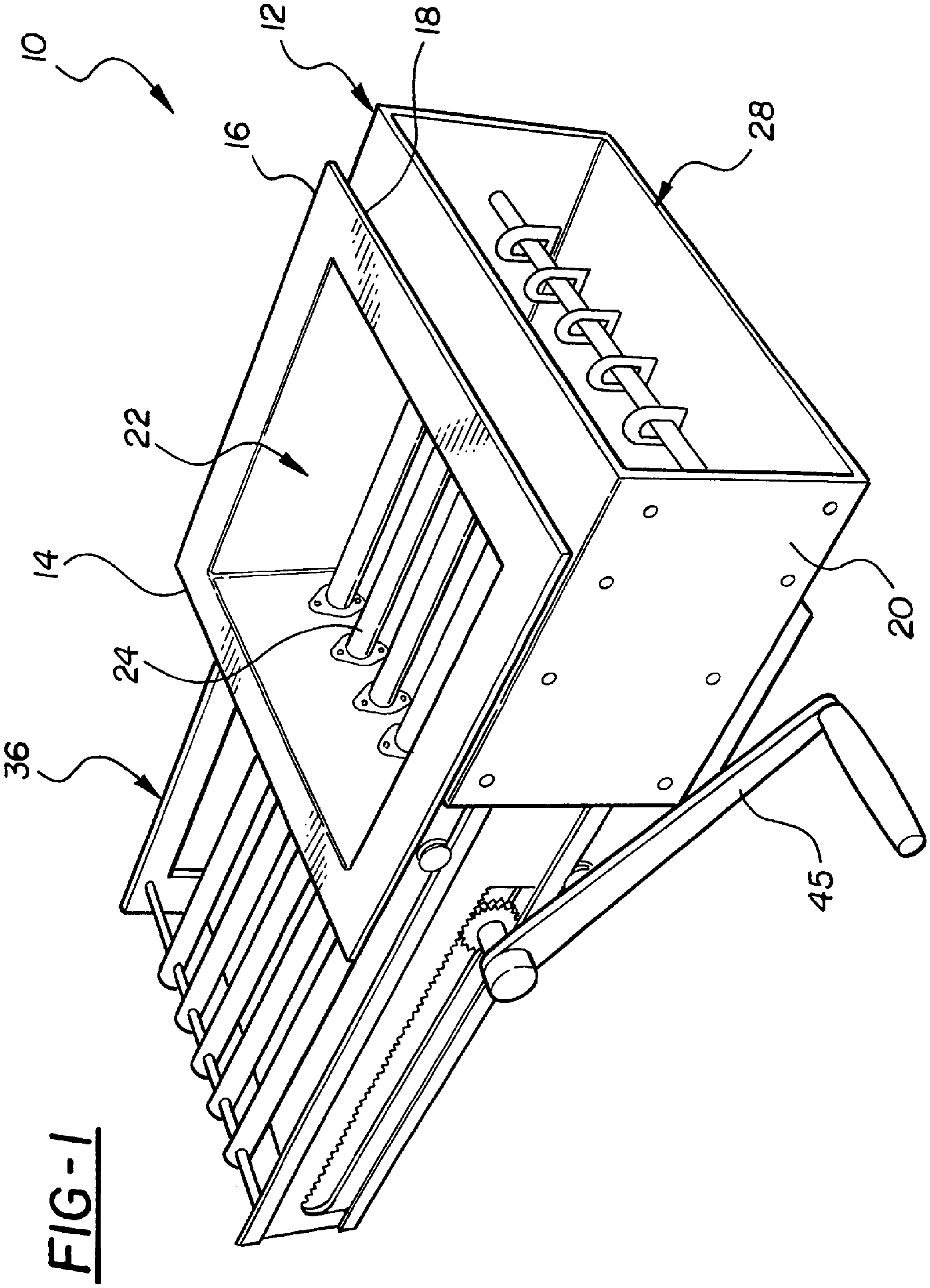
FIG. 1 is a perspective view of a manually operated permanent magnet separator of the present invention.
Figure 2:
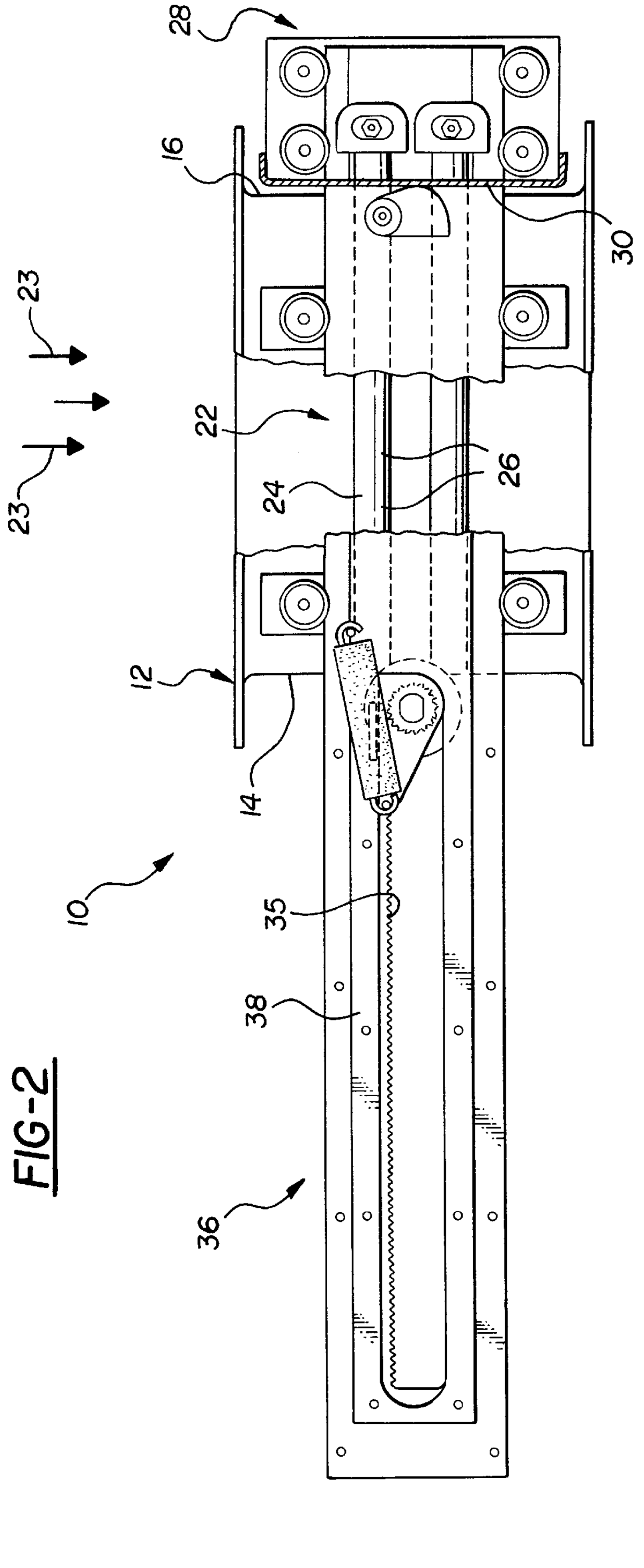
FIG. 2 is a side plan view of the permanent magnet separator of the present invention.
Figure 3:
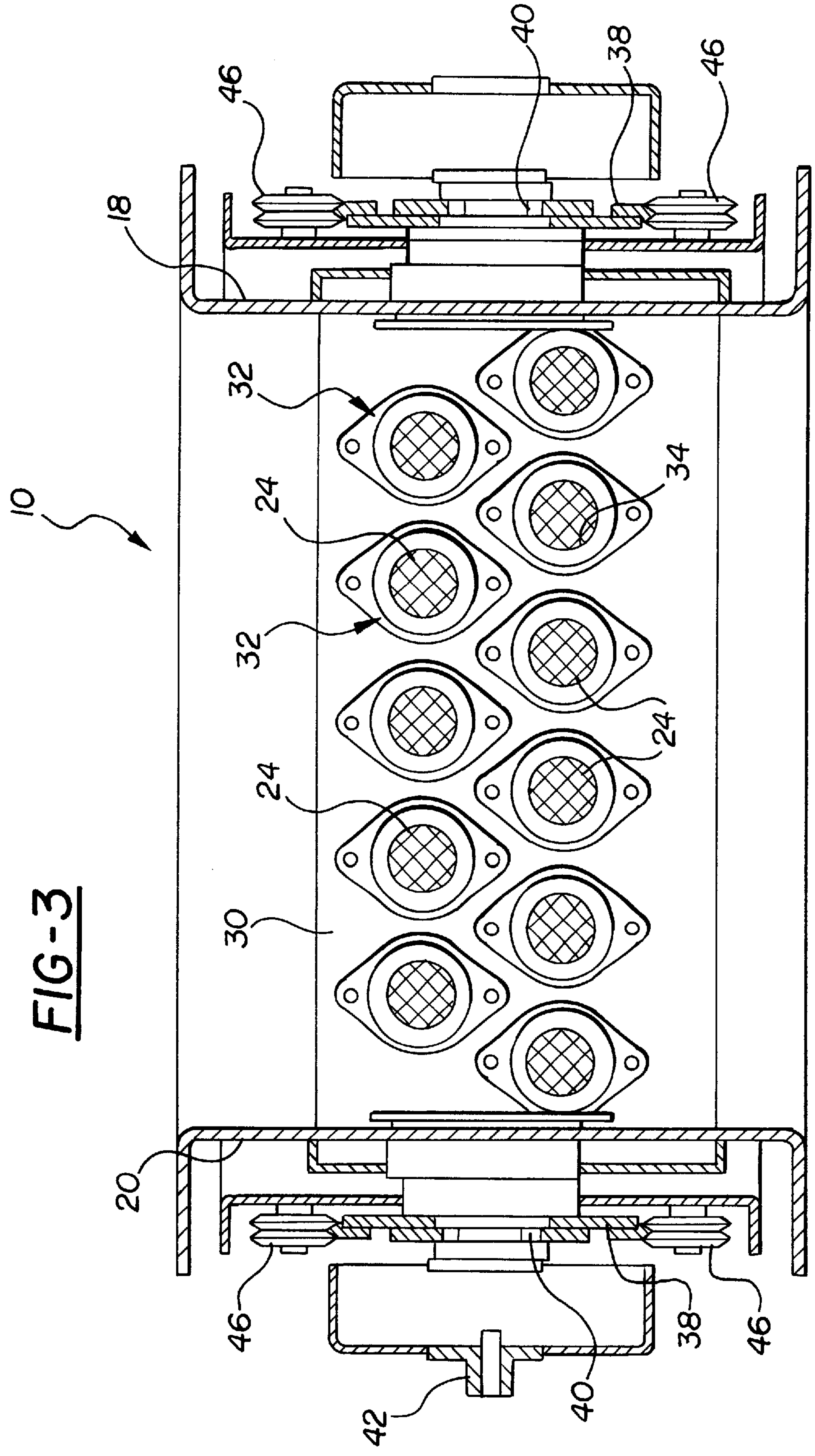
FIG. 3 is a cross-sectional end view of the permanent magnet separator of the present invention.

Referring now to FIGS. 1–3, a permanent magnet separator of the type employed for removing ferrous materials from a product stream is generally indicated at 10. The permanent magnet separator 10 includes a housing, generally indicated at 12, having a pair of end walls 14, 16 and a pair of side walls 18, 20 disposed spaced from one another and extending between the end walls so as to define a product flow path 22. Product to be purified of ferrous material passes through the flow path 22 as indicated by arrows 23 (FIG. 2). Such material is known as "tramp metal contaminants" in the related art. The permanent magnet separator 10 of the present invention may be employed for separating tramp metal contaminants from many finely ground cohesive materials, such as gypsum, barium, carbonate, fuller's earth, lime, cohesive chemicals, confectionary sugar, corn starch, flour, wood flour, and fibrous materials like chopped hay, alfalfa, flax or the like. In addition, the present invention may be used to remove tramp metal contaminants from grain, coffee, peanuts, and the like in the processing or handling steps of such materials.

To this end, the permanent magnet separator 10 of the present invention employs a plurality of non-magnetic (typically stainless steel) tubes 24 having a plurality of magnets 26 supported within the tubes 24. The non-magnetic tubes 24 may be arranged in staggered rows and supported between the end walls 14, 16 by a frame or similar structure, referred to as a drawer and generally indicated at 28, in a direction transverse to the product flow. The drawer 28 is movable between a first position wherein the tubes 24 (and thus the magnets 26) are positioned within the product flow path 22 and a second position wherein the magnets 26 are withdrawn from the flow path 22. These tubes 24 create an effective magnetic circuit for filtering the product as it flows through the flow path 22 of the housing 12. The magnets 26 may be of any type, but preferably are rare earth neodymium-iron-boron magnets, rare earth samarium-cobalt magnets for higher operating temperatures or even economical ceramic 8 magnets for less severe tramp iron applications. Obviously, selection of the specific magnetic material will depend upon the given application.

Referring specifically to FIG. 3, a stripper plate 30 is disposed between the housing 12 and the drawer 28. The stripper plate 30 includes a plurality of apertures, generally indicated at 32, which correspond to and are in close conforming contact with the tubes 24 and through which the tubes 24 pass as the drawer 28 is moved between its first and second positions. Like the drawer 28, the stripper plate 30 is movable between a first position adjacent the end walls 16 of the housing 12 when the drawer 28 is in its first position and the magnets 26 are disposed in the product flow path 22 to a second position spaced a predetermined distance from the housing 12 as the drawer 28 is moved to its second position and the magnet 26 (via the tubes 24) are withdrawn from the product flow path 22. Once the stripper plate 30 has arrived at its second position, it stops. However, the drawer 28 continues to move as it withdraws the tubes 24 and magnets 26 from the product flow path 22. Each of the apertures 32 in the stripper plate 30 include scraper gaskets 34 which serve to strip material which has been attracted to the tubes 24 by the magnetic force generated by the magnets 26 as will be explained in greater detail below.

Figure 4:
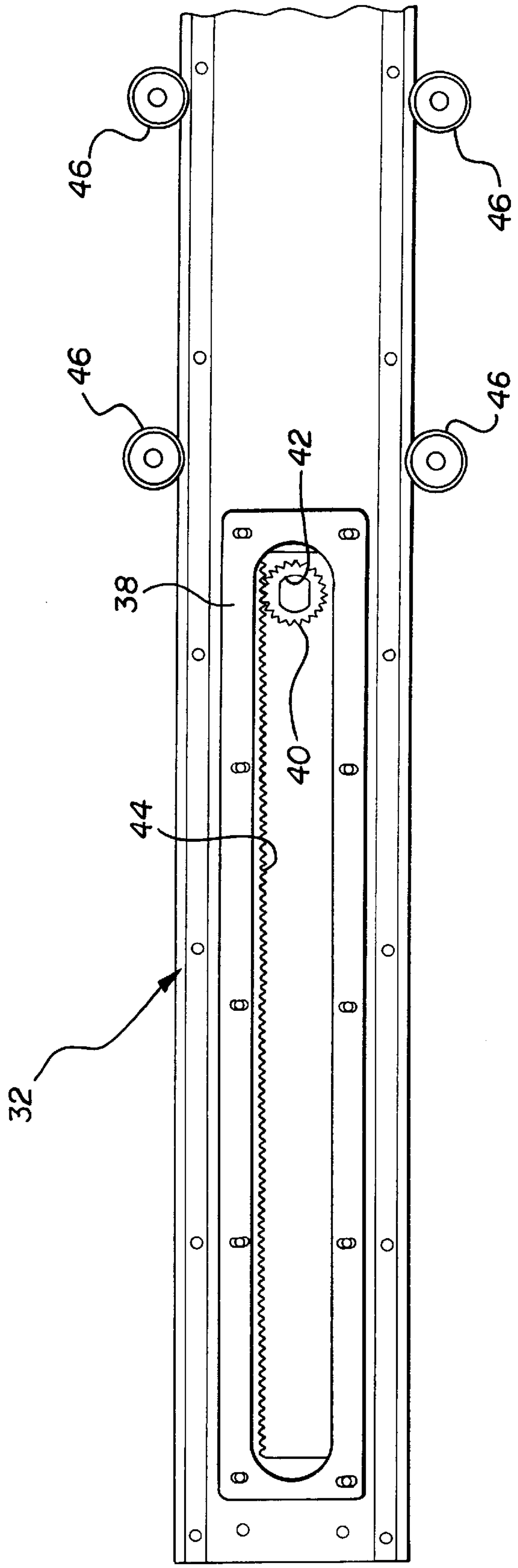
FIG. 4 is a partial side view of the actuator of the present invention.

The magnetic separator 10 of the present invention also includes an actuator, generally indicated at 36 in FIGS. 1, 2 and 4. Portions of the actuator are also illustrated in FIG. 3. The actuator 36 includes a movable rack 38 operatively coupled to the drawer 28 and a sprocket gear 40. The sprocket gear 40 is rotatably driven to provide rectilinear movement to the rack 38 such that the drawer 28 may be selectively moved between its first and second positions. Preferably, and as illustrated in the figures, the actuator 36 includes a pair of racks 38 located on either side of the housing 12. Each of the racks is operatively coupled to the drawer 28. Likewise, in the preferred embodiment, a pair of sprocket gears 40 are employed to move the pair of racks 38. The gears 40 are mounted on a common shaft 42. Each rack 38 includes gear teeth 44 formed thereon for a predetermined length of the rack 38. The sprocket gears 40 mesh with the gear teeth 44 on the rack 38 to provide rectilinear movement of the rack 38 in two directions transverse to the flow of product through the flow path 22 thereby moving the drawer 28 between its first and second position.

At least one of the sprocket gears 40 may be manually driven via a crank handle 45 or the like as shown in FIG. 1. In this way, the common shaft 42 is also rotated and both racks 38 are moved. Alternatively, at least one of the sprocket gears 40 may be operatively coupled to a drive motor. In this way also, the common shaft may be rotated to move the racks 38. However, those having ordinary skill in the art will appreciate that the sprocket gears 40 need not directly mesh with the gear teeth 44 on the racks 38 and that additional gears, a gear train or any other mechanical device may be employed between a source of power (manual or otherwise) and the rack 38 to impart rectilinear movement to the rack 38.

The magnetic separator 10 also employs a plurality of V-shaped idler wheels 46 which are located on either side of the pair of racks 38. The idler wheels 46 support the pair of racks 38 as they are moved rectilinearly in two directions. Obviously, any number of the idler wheels 46 may be employed depending upon a number of factors including the length of the racks 38, the number and thus the weight of the magnets employed in the separator, or even the size of the magnetic separator 10 itself.

Movement of the rack 38 moves the tubes 24 (and the magnets 26 housed therein) to the right as viewed in FIG. 2 and out of the product flow through the hopper 22. At the initiation of this movement, the stripper plate 30 will be moved to the right also until it has reached its predetermined second position. Thereafter, the stripper plate 30 is stationary relative to the moving tubes 24 and results in a removal of all ferrous materials attached to the tubes 24 under the influence of the magnets 26 by the shaving action of the scraper gaskets 34 acting on the tubes 24 moving through the apertures 32 on the stripper plate 30.

The actuator 36 of the present invention has distinct advantages over the related art. More specifically, the rack and sprocket arrangement employed by the actuator 36 is much more cost effective than the pneumatic cylinders employed in the related art and results in an improved reliability of operation regardless of the application and/or environment. The rack and sprocket arrangement also reduces the force required to withdraw the tubes from the product flow path and helps to eliminate jamming caused by misaligned tubes. Importantly, a permanent magnet separator unit employing the actuator 36 of the present invention may be quickly and easily upgraded from a manual, "quick clean" to a self-clean model at minimal cost. The same could not be achieved using the pneumatic piston cylinder arrangement of the related art.

A gasket (not shown) is typically located between the stripper plate 30 and a portion of the housing, such as the end plate 16, or other fixed structure. It is not uncommon in certain applications known in the related art for sufficient adhesion to develop between the stripper plate and this gasket. When this occurs, initial movement of the tubes from their product flow position to their position outside the product flow path will not overcome the adhesion and, thus, the stripper plate will fail to move to its designated predetermined second position for properly cleaning the tubes.

Figure 5:
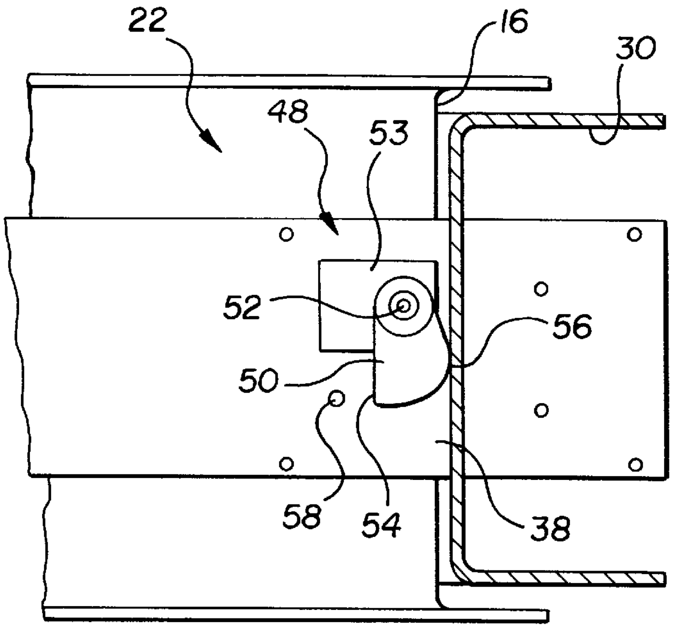
FIG. 5 is a partial side view illustrating the auxiliary stripper plate actuator of the present invention with the stripper plate disposed in its closed position.
Figure 6:
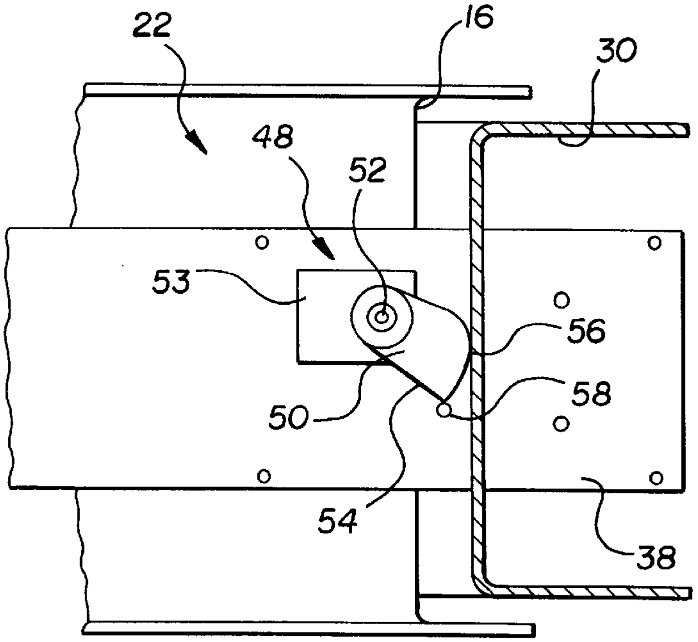
FIG. 6 is a partial side view of the auxiliary stripper plate actuator of the present invention with the stripper plate disposed in its open position.

The permanent magnet separator 10 of the present invention overcomes this deficiency in the related art by employing an stripper plate actuator, generally indicated at 48 in FIGS. 5 and 6 which assists in moving the stripper plate 30 from its first position adjacent the housing 12 to its second position spaced from the housing 12. The stripper plate actuator 48 includes a cam 50 pivotally mounted on the housing 12, for example, to a flange 53 on the end plate 16 or some other stationary structure. The cam 50 is rotatable about an axis 52. Further, the cam 50 includes a flat contact surface 54 and an arcuate or curved biasing surface 56. The rack 38, or some other structure movable therewith such as the drawer 28, includes a cam actuator 58. As illustrated in the figures, the cam actuator 58 is a projection such as a rod or bolt extending laterally of the rack 38. As the rack 38 moves to the right in FIG. 6, the cam actuator 58 will be brought into engagement with the flat contact surface 54 of the cam 50 and slides along the surface 54 as it pivots the cam 50 about the axis 52. If the stripper plate 30 has not automatically moved to its predetermined position, the arcuate or curved surface 56 of the cam 50 will be brought to bear in biasing relation against the stripper plate 30. In this way, the stripper plate actuator 48 ensures that the stripper plate 30 is moved to its second position spaced from the housing 12. In essence, the cam 50 breaks any seal acting between the stripper plate 30 and the gasket (not shown). The cam actuator 58 will then pass the cam 50 which allows the cam 50 to pivot about its axis 52 back to its original position under the influence of gravity as shown in FIG. 5. As the tubes 24 are moved back to their position within the product flow path 22 and the unit is closed, the cam actuator 58 will briefly engage the curved biasing surface 56 of the cam 50 pivoting it about its axis 52. Once past, the cam 50 will again move to its original position where the first contact surface 54 extends in a direction transverse to the movement of the cam actuator 58 under the influence of gravity as shown in FIG. 5.

The stripper plate actuator 48 of the present invention thereby facilitates an improved operation of the permanent magnet separator 10 resulting in better cleaning of the tubes 24 and reduced wear on the scraper gaskets 34.

The stripper plate 30 is sometimes referred to as a "door" because it acts to open and shut the permanent magnet separator unit at the beginning and end of the cleaning cycle, respectively. In its function as a door, it is important that the stripper plate 30 be sealed relative to the housing 12 when the stripper plate 30 is in its first position. To this end, the permanent magnet separator 10 of the present invention includes a latch mechanism generally indicated at 60 in FIGS. 7 and 8.

The latch mechanism 60 acts to automatically bias the stripper plate 30 toward the housing 12 and into its first position such that the stripper plate 30 is in sealing engagement with the housing 12 when the drawer 28 is moved to its first position and the magnets 26 are positioned within the product flow path 22.

More specifically, the latch mechanism 60 includes a latch cam, generally indicated at 62, and a biasing mechanism 64 operatively interconnecting the latch cam 62 and the stripper plate 30. The latch cam 62 is pivotable about an axis 66 between a release position (FIG. 8) wherein the stripper plate 30 is in its second position spaced from the housing 12 and a latched position (FIG. 7) wherein the drawer 28 is moved to its first position and the biasing mechanism 64 biases the stripper plate 30 toward the housing 12. In the preferred embodiment, the axis 66 about which the cam latch 62 rotates is coincident with the axis of rotation of the sprocket gears 40. However, those having ordinary skill in the art will appreciate that these axes need not be coincident and that other arrangements are possible within the scope of the appended claims.

The cam latch 62 includes a lever arm 68 extending from the axis 66. The biasing mechanism includes a coiled spring 64 extending between the lever arm 68 and a lug 70 on the stripper plate 30 (or some other related, attached structure). The coiled spring 64 is operatively connected to the lever arm 68 at a point 72 spaced from the axis 66 such that movement of the lever arm 68 in a direction away from the stripper plate 30 and past an imaginary over center line extending through the center of the axis 66 causes the lever arm 68 to be positively held in the latched position shown in FIG. 7.

A lever arm actuator 74 is employed to engage the lever arm 68 when the drawer 28 is moved to its first position to rotate the lever arm 68 about the axis 66 and past the over center line to bias the stripper plate 30 to its first position under the influence of the coiled spring 64.

FIG. 7 illustrates the disposition of the latch cam 62 when the stripper plate 30 is closed and the tubes 24 are positioned to filter the product passing through the product flow path 22. In this disposition, the spring 64 exerts a closing force on the stripper plate 30. When the tubes 24 are to be cleaned, the stripper plate actuator 48 illustrated in FIGS. 5 through 6 ensures that the stripper plate 30 is unseated from the gasket against end wall 16. This action will also move the latch cam 62 clockwise from the position shown in FIG. 7 to that shown in FIG. 8.

After cleaning and when the tubes 24 are moved back within the product flow path 22, the stripper plate 30 must again be sealed against the gasket. The latch mechanism 60 affects this seal. More specifically, the lever arm actuator 74 which is carried by at least one of the racks 38, or some other structure movable therewith, engages surface 76 on the lever arm 68 driving it counterclockwise from the position shown in FIG. 8 to that shown in FIG. 7. The spring 64 is then placed in tension which, through other structure not shown, acts on the stripper plate 30 to seal it against the gasket.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A magnetic separator comprising:

a housing defining a product flow path through which material may pass;

a drawer and a plurality of non-magnetic tubes operatively connected to said drawer and within which are supported a corresponding plurality of magnets, said drawer being movable between a first position wherein said plurality of magnets are positioned within said product flow path and a second position wherein said plurality of magnets are withdrawn from said flow path;

a stripper plate disposed between said housing and said drawer, said stripper plate having a plurality of apertures corresponding to and in close conforming contact with said plurality of non-magnetic tubes and through which said plurality of tubes pass as said drawer is moved between said first and second positions;

said stripper plate being movable from a first position adjacent said housing when said drawer is in its first position and said plurality of magnets are disposed in said product flow path to a second position spaced a predetermined distance from said housing as said drawer is moved to its second position and said plurality of tubes are withdrawn from said product flow path, said plurality of apertures serving to strip material which has been attracted to said plurality of magnets; and an actuator including a movable rack operatively coupled to said drawer and a sprocket gear, said sprocket gear being rotatably driven to provide rectilinear movement of said rack such that said drawer may be selectively moved between said first and second positions.

2. A magnetic separator as set forth in claim 1 wherein said rack includes gear teeth formed thereon for a predetermined longitudinal length of said rack, said sprocket gear meshing with said gear teeth on said rack to provide rectilinear movement of said rack in two directions transverse to the flow of product through said flow path to move said drawer between said first and second positions.

3. A magnetic separator as set forth in claim 1 wherein said sprocket gear is manually driven to move said rack.

4. A magnetic separator as set forth in claim 1 wherein said sprocket gear is operatively coupled to a drive motor to move said rack.

5. A magnetic separator as set forth in claim 1 including a plurality of idler wheels disposed on either side of said rack and supporting said rack for rectilinear movement in two directions transverse to the flow of product through said flow path.

6. A magnetic separator as set forth in claim 1 including a pair of racks disposed on either side of said housing and operatively coupled to said drawer, a pair of sprocket gears mounted on a common shaft, said pair of sprocket gears being rotatably driven to provide rectilinear movement of said rack such that said drawer may be selectively moved between said first and second positions.

7. A magnetic separator as set forth in claim 6 wherein at least one of said sprocket gears is manually driven to rotate said common shaft and to move said rack.

8. A magnetic separator as set forth in claim 7 wherein at least one of said sprocket gears is operatively coupled to a drive motor to rotate the common shaft and to move said rack.

9. A magnetic separator as set forth in claim 6 including a plurality of idler wheels disposed on either side of said pair of racks and supporting said pair of said racks for rectilinear movement in two directions transverse to the flow of product through said flow path.

10. A magnetic separator comprising:

a housing defining a product flow path through which material may pass;

a drawer and a plurality of non-magnetic tubes operatively coupled to said drawer and within which are supported a corresponding plurality of magnets, said drawer being movable between a first position wherein said plurality of magnets are positioned within said product flow path and a second position wherein said plurality of magnets are withdrawn from said flow path;

a stripper plate disposed between said housing and said drawer, said stripper plate having a plurality of apertures corresponding to and in close conforming contact with said plurality of non-magnetic tubes and through which said plurality of tubes pass as said drawer is moved between said first and second positions;

said stripper plate being movable from a first position adjacent said housing when said drawer is in its first position and said plurality of magnets are disposed in said product flow path to a second position spaced a predetermined distance from said housing as said drawer is moved to its second position and said plurality of tubes are withdrawn from said product flow path, said plurality of apertures serving to strip material which has been attracted to said plurality of magnets; and a stripper plate actuator which assists in moving said stripper plate from its first position adjacent said housing to its second position spaced from said housing.

11. A magnetic separator as set forth in claim 10 wherein said stripper plate actuator includes a cam mounted to said housing and rotatable about an axis and a cam actuator which is moved into engagement with said cam to rotate it about said axis into engagement with said stripper plate to bias said stripper plate to its second position spaced from said housing.

12. A magnetic separator as set forth in claim 11 wherein said cam actuator is movable with said drawer as said drawer is moved from its first position to its second position.

13. A magnetic separator as set forth in claim 11 wherein said cam actuator is mounted to said drawer.

14. A magnetic separator as set forth in claim 11 wherein said cam actuator is a projection, said cam including a contact surface and a biasing surface, said projection engaging and sliding along said contact surface to rotate said cam about said axis and thereby move said biasing surface into engagement with said stripper plate to bias said stripper plate to its second position spaced from said housing.

15. A magnetic separator as set forth in claim 14 wherein said contact surface is flat and extends in a direction transverse to the movement of said projection prior to engagement thereof and said biasing surface is curved.

16. A magnetic separator comprising:

a housing defining a product flow path through which material may pass;

a drawer and a plurality of non-magnetic tubes operatively coupled to said drawer and within which are supported a corresponding plurality of magnets, said drawer being movable between a first position wherein said plurality of magnets are positioned within said product flow path and a second position wherein said plurality of magnets are withdrawn from said flow path;

a stripper plate disposed between said housing and said drawer, said stripper plate having a plurality of apertures corresponding to and in close conforming contact with said plurality of non-magnetic tubes and through which said plurality of tubes pass as said drawer is moved between said first and second positions;

said stripper plate being movable from a first position adjacent said housing when said drawer is in its first position and said plurality of magnets are disposed in said product flow path to a second position spaced a predetermined distance from said housing as said drawer is moved to its second position and said plurality of tubes are withdrawn from said product flow path, said plurality of apertures serving to strip material which has been attracted to said plurality of magnets; and a latch mechanism which acts to automatically bias said stripper plate toward said housing into its first position such that said stripper plate is in sealing engagement with said housing when said drawer is moved to its first position and said magnets are positioned within said product flow path.

17. A magnet separator as set forth in claim 16 wherein said latch mechanism includes a latch cam and a biasing mechanism operatively interconnecting said latch cam and said stripper plate, said latch cam being pivotable about an axis between a release position wherein said stripper plate is in its second position spaced from said housing and a latched position wherein said drawer is moved to its first position and said biasing mechanism biases said stripper plate toward said housing.

18. A magnet separator as set forth in claim 17 wherein said latch cam includes a lever arm extending from said axis, said biasing mechanism including a coiled spring extending between said lever arm and said stripper plate, said coiled spring being operatively connected to said lever arm at a point spaced from said axis such that movement of said lever arm in a direction away from said stripper plate and past an imaginary over center line extending through the center of said axis causes the lever arm to be positively held in said latched position.

19. A magnet separator as set forth in claim 18 including a lever arm actuator which engages said lever arm when said drawer is moved to its first position to rotate said lever arm about said axis and past said over center line to bias said stripper plate to its first position under the influence of said coiled spring.

* * * * *